Figure 1:
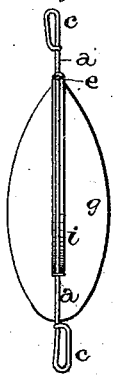
Figure 2:
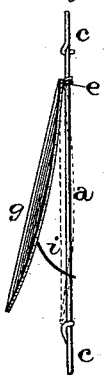
Figure 3:

L. S. HILL.
SPOON-HOOKS FOR FISHING.

No. 177,639.          Patented May 23, 1876.

WITNESSES:
Wm Garner
F. M. Burnham

INVENTOR:
L. S. Hill
per
F. A. Lehmann, Atty.

UNITED STATES PATENT OFFICE.

LYSANDER S. HILL, OF GRAND RAPIDS, MICHIGAN, ASSIGNOR OF ONE-HALF HIS RIGHT TO BENJ. R. STEVENS, OF SAME PLACE.

IMPROVEMENT IN SPOON-HOOKS FOR FISHING.

Specification forming part of Letters Patent No. 177,639, dated May 23, 1876; application filed April 1, 1876.

*To all whom it may concern:*

Be it known that I, LYSANDER S. HILL, of Grand Rapids, in the county of Kent and State of Michigan, have invented certain new and useful Improvements in Spoon-Baits; and I do hereby declare the following to be a full, clear, and exact description of the invention, such as will enable others skilled in the art to which it pertains to make and use it, reference being had to the accompanying drawings, which form part of this specification.

My invention relates to an improvement in spoon-baits; and it consists in allowing the spoon to move back and forth on the wire, and providing it with a spring, so that it can close inward when the fish takes hold of it, as will be more fully described hereinafter.

The accompanying drawings represent my invention.

$a$ represents a wire of suitable length and thickness, which has a loop, $c$, formed at each end for the attachment of the fishing-line, and the attachment of the hook and one or more other spoons when desired. Upon this wire, at a short distance from the loop to which the line is attached, is formed a stop or enlargement, $e$, of any kind, which limits the length the spoon $g$ is allowed to slide on the wire. This spoon is attached to the wire by means of a small eye formed upon its upper end, and has secured to its under side the flat spring $i$, which keeps the spoon away from the wire, but nevertheless allows the spoon to close inward on the wire when the fish takes hold of it, so that the hook will be the more sure to catch in its mouth. The lower end of the spring has a hole through it, so as to pass over the wire, and thus slide up and down with the spoon, and thus allow the spoon to close inwardly upon the wire.

Having thus described my invention, I claim—

The combination of the rod or wire $a$, the spoon $g$, attached loosely thereto at its upper end, and spring $i$, the said spring having a hole through its lower end, so as to slide up and down on the rod with the spoon, substantially as shown and described.

In testimony that I claim the foregoing I have hereunto set my hand this 25th day of March, 1876.

LYSANDER S. HILL.

Witnesses:
SAMUEL B. HORNE,
GEORGE THOMSON.